(12) United States Patent
Kwon (10) Patent No.: US 10,188,041 B2
(45) Date of Patent: Jan. 29, 2019

(54) SQUARE BALER

(71) Applicant: Oh Muk Kwon, Iksan-si (KR)

(72) Inventor: Oh Muk Kwon, Iksan-si (KR)

(*) Notice: Subject to any disclaimer, the term of this patent is extended or adjusted under 35 U.S.C. 154(b) by 55 days.

(21) Appl. No.: 15/525,343

(22) PCT Filed: Nov. 6, 2015

(86) PCT No.: PCT/KR2015/011874
§ 371 (c)(1),
(2) Date: May 9, 2017

(87) PCT Pub. No.: WO2016/080684
PCT Pub. Date: May 26, 2016

(65) Prior Publication Data
US 2017/0347530 A1    Dec. 7, 2017

(30) Foreign Application Priority Data

Nov. 18, 2014  (KR) .......................... 10-2014-0160604

(51) Int. Cl.
*A01F 15/00*  (2006.01)
*A01F 15/02*  (2006.01)
*A01F 15/08*  (2006.01)
*B30B 7/04*   (2006.01)

(52) U.S. Cl.
CPC .............. *A01F 15/02* (2013.01); *A01F 15/08* (2013.01); *B30B 7/04* (2013.01)

(58) Field of Classification Search
CPC ........ A01F 15/02; A01F 15/10; A01F 15/042; A01F 15/044; A01F 15/046; A01F 15/0825; A01F 15/0858; A01F 15/08; A01F 15/0875; A01F 15/0833; A01F 15/148; A01F 15/07; A01F 15/141; A01F 15/14; B30B 7/04
USPC ........ 56/443, 446, 341, 343, 432, 441, 13.5; 100/179, 187, 190
See application file for complete search history.

(56) References Cited

U.S. PATENT DOCUMENTS 4,711,078 A * 12/1987 Schaible .............. A01D 85/002
                                                     100/4
5,913,801 A *  6/1999 Bottinger ............. A01B 79/005
                                                     56/10.2 R
6,708,478 B1   3/2004 Mesmer et al.
(Continued)

FOREIGN PATENT DOCUMENTS

JP    06-255610 A    9/1994
JP    11-206239 A    8/1999
(Continued)

*Primary Examiner* — Robert E Pezzuto
(74) *Attorney, Agent, or Firm* — Novick, Kim & Lee, PLLC; Jae Youn Kim (57) ABSTRACT

A square baler includes a frame, a bale chamber formed on the frame, a knotting part having a knotting member and a needle member, wherein the knotting member is provided to knot and cut a bale string, and the needle member is provided to perform a vertical angular movement and guide the bale string to the knotting member, a pickup part picking up and providing hay in a front inner space of the bale chamber, and a rake part rotatably installed so as to, during the rotation and downward motion of the rake part, push and compress the hay, which was picked up and provided to the inner space of the bale chamber, towards the rear side.

4 Claims, 7 Drawing Sheets

(56) References Cited

U.S. PATENT DOCUMENTS

| | | | | |
|---|---|---|---|---|
| 7,140,170 | B2 * | 11/2006 | Krone | A01F 15/0825 56/341 |
| 7,152,521 | B2 * | 12/2006 | Freihart | A01F 15/0858 100/2 |
| 9,526,212 | B2 * | 12/2016 | Smith | A01F 15/0875 |

FOREIGN PATENT DOCUMENTS

| | | | |
|---|---|---|---|
| KR | 10-1403857 | B1 | 6/2014 |
| KR | 10-1404604 | B1 | 6/2014 |

\* cited by examiner

SQUARE BALER

TECHNICAL FIELD

The present invention relates to a square baler that is formed in a different structure from an existing plunger type square baler so as to have excellent productivity and be able to effectively compress and bale hay in a bale chamber.

BACKGROUND ART

A conventional baler is a piece of farm machinery that is mounted to the back of a farm tractor and towed so as to rake and gather hay, straw, corn stalks, etc. that has been cut and is spread over the ground, and compact it into bales.

Such balers are classified into round balers and square balers and function to collect and form hay, straw, corn stalks, etc., into round-type bales and rectangular (hexahedral)-type bales, respectively. Particularly, round balers further have a function to seal cylindrical bales with a wrapping material to prevent the introduction of moisture or foreign materials into the bales in order to store the bales as animal feed later.

In the case of square balers, while the balers also form hay, straw, corn stalks, etc. into rectangular bales in order to store the bales as animal fodder or bedding, if an object to be compacted into bales consists of thick, hard, long stalks such as from corn, etc., neither square balers nor round balers can effectively compact the stalks into bales.

A conventional square baler includes on a front side of a frame a connection part that is towed by a tractor, wherein a power transmission is provided on the connection part to receive power from the tractor. A pickup part is provided in a manner of being off the ground on one side of the frame so as to pickup hay, straw, corn stalks, etc. during powered rotation so that picked-up vegetation is carried to a bale chamber while being cut to a predetermined size by a carrier part provided on the back of the pickup part. The hay carried to the bale chamber is compressed into a rectangular (hexahedral) bale by a powered reciprocating plunger. Here, a compression density of the vegetation is regulated by a tension bar provided in the bale chamber, and a length of the bale is regulated by a wheel to measure the length of the bale. When formed to have a predetermined shape (size), the bale is bound by a binder. The binder includes a twine knotter that binds bales so as not to be untied. Bound bales are successively pushed towards the back side of the bale chamber and discharged out of the bale chamber via a bale chute.

DISCLOSURE

Technical Problem

Accordingly, the present invention has been made keeping in mind the above problems occurring in the related art, and an object of the present invention is to provide a square baler which is formed in a different structure from an existing plunger type square baler so as to have excellent productivity and be able to effectively compress and bale hay, straw, corn stalks, etc. in a bale chamber.

Technical Solution

In order to accomplish the above object, the present invention provides a square baler including:
a frame;
a bale chamber formed on the frame so as to be opened forward and backward, and having a square cross-section;
a knotting part having a knotting member and a needle member, wherein the knotting member is provided at an upper portion of a rear side of the bale chamber so as to knot and cut a bale string, and the needle member is provided at a lower part of the rear side of the bale chamber so as to perform vertical angular movement and guide the bale string to the knotting member;
a pickup part picking up and providing hay in an inner space of a front side of the bale chamber; and
a rake part rotatably installed on an upper portion of the front side of the bale chamber so as to, during the rotation and downward motion of the rake part, push and compress the hay, which was picked up and provided to the inner space of the bale chamber, towards the rear side where the bale string is positioned between the knotting member and the needle member.

Particularly, the square baler may preferably include a compression arm to prevent the hay, which was pushed and compressed backwards by the rake part, from being uncompressed during the rotation and upward motion of the rake part and re-compress the hay. The compression arm may preferably be provided at a lower side of the bale chamber between the rake part and the needle member such that the compression arm is able to perform a vertical angular motion.

The compression arm may preferably be operated such that the compression arm performs an upward angular motion into the inner space of the bale chamber from the lower side of the bale chamber during the rotation and upward motion of the rake part, and the compression arm performs a downward angular motion from the inner space of the bale chamber towards the lower side of the bale chamber during the rotation and downward motion of the rake part.

The rake part may preferably include a drive shaft provided on an upper side of the bale chamber such that the drive shaft is able to rotate by a drive source, a support stage extending perpendicular to an end of the drive shaft, a rake member having an upper end rotatably fixed to the support stage, an extension member provided to extend upwards from the upper end of the rake member, a rotary shaft provided in front of the drive shaft, and an auxiliary member provided such that a lower end thereof is rotatably fixed to the rotary shaft, and an upper end thereof is shaft-connected to an upper end of the extension member.

Advantageous Effects

As described above, the square baler according to the present invention is formed in a different simple structure from an existing plunger type square baler so as to advantageously have excellent productivity and be able to effectively compress and bale hay in a bale chamber.

BEST MODE

Hereinbelow, embodiments of a square baler of the present invention will be described with reference to the accompanying drawings. However, technical scope of the present invention is not limited to embodiments disclosed in the following description.

Figure 1:
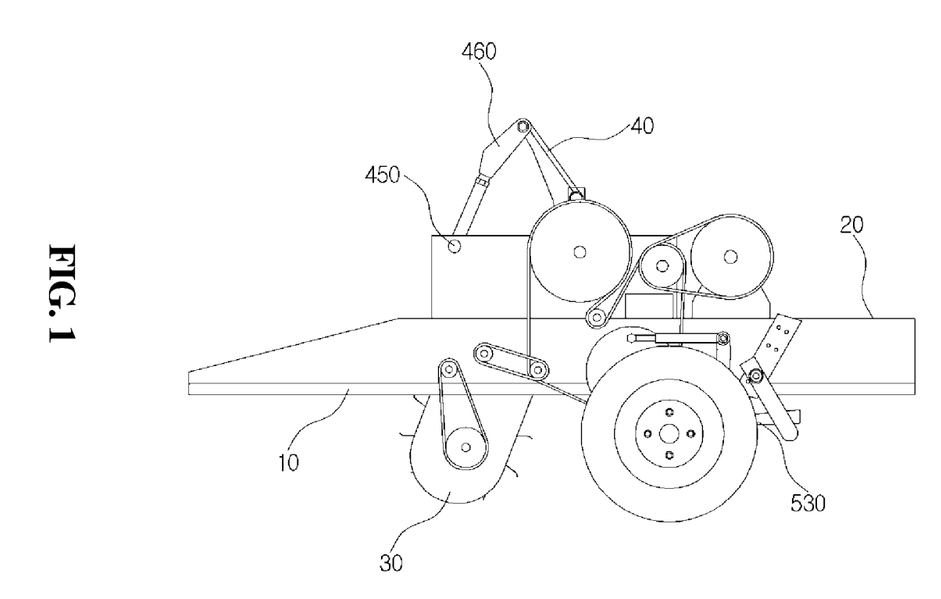
FIG. 1 is a side view schematically illustrating a square baler according to an embodiment of the present invention.
Figure 2:
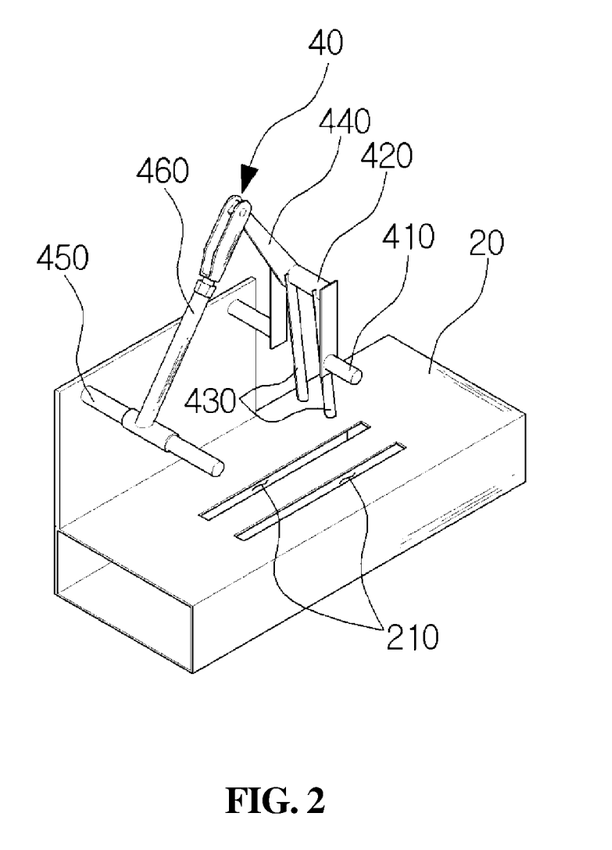
FIG. 2 is a partially perspective view schematically illustrating a rake part.

FIG. 1 is a side view schematically illustrating a square baler according to an embodiment of the present invention, and FIG. 2 is a partially perspective view schematically illustrating a rake part.

As illustrated in FIG. 1, the square baler generally includes a frame 10, a bale chamber 20, a pickup part 30, a rake part 40, and a knotting part 50.

The frame 10 has a front connection part that is connected to a tractor or the like, and a power transmission that receive power from the tractor. Since the connection part and the power transmission are conventional elements of a baler, a detailed description thereof will be omitted.

As illustrated in FIGS. 1 and 2, the bale chamber 20 has a square cross section and is provided on the frame 10 so as to be opened forward and backward.

The pickup part 30 is provided on a front lower side of the bale chamber 20. The pickup part 30 serves to pick up hay without contacting the ground, and provide the hay towards a front side of an inner space of the bale chamber 20.

The hay provided to the front side of the inner space of the bale chamber 20 by the pickup part 30 is pushed and compressed towards a rear side of the inner space of the bale chamber 20 by the rake part 40, instead of a plunger of a conventional square baler.

As illustrated in FIG. 2, the rate part 40 includes a drive shaft 410, a support stage 420, a rake member 430, an extension member 440, a rotary shaft 450, and an auxiliary member 460.

The drive shaft 410 is provided on the upper side of the bale chamber 20 such that the drive shaft can be rotated by a drive source, i.e. power from the tractor. The drive shaft 410 is rotated in a counterclockwise direction.

The support stage 420 extends perpendicular to an end of the drive shaft 410.

The rake member 430 serves to push the hay, which was provided to the front side of the inner space of the bale chamber 20, towards the rear side of the inner space of the bale chamber 20. An upper end of the rake part is rotatably fixed to the support stage 420. The extension member 440 is provided to extend upwards from the upper end of the rake member 430. The rotary shaft 450 is rotatably provided above the bale chamber 20 in front of the drive shaft 410. The auxiliary member 460 is provided such that a lower end thereof is rotatably fixed to the rotary shaft 450, and an upper end thereof is shaft-connected to an upper end of the extension member 440. When the drive shaft 410 rotates, the rake member 430 is moved into the inner space of the bale chamber 20 while being rotated and moved down by mediation of the auxiliary member 460, thereby pushing and compressing the hay provided in the inner space of the bale chamber 30 in a backward direction. Then, after pushing and compressing the hay backwards, the rake member is rotated and moved up.

Inlet slits 210 are longitudinally provided in an upper plate of the bale chamber 20 in order to allow the rake member 430 to be introduced into the inner space of the bale chamber 20 when the rake member 430 is rotated and moved down.

Figure 3:
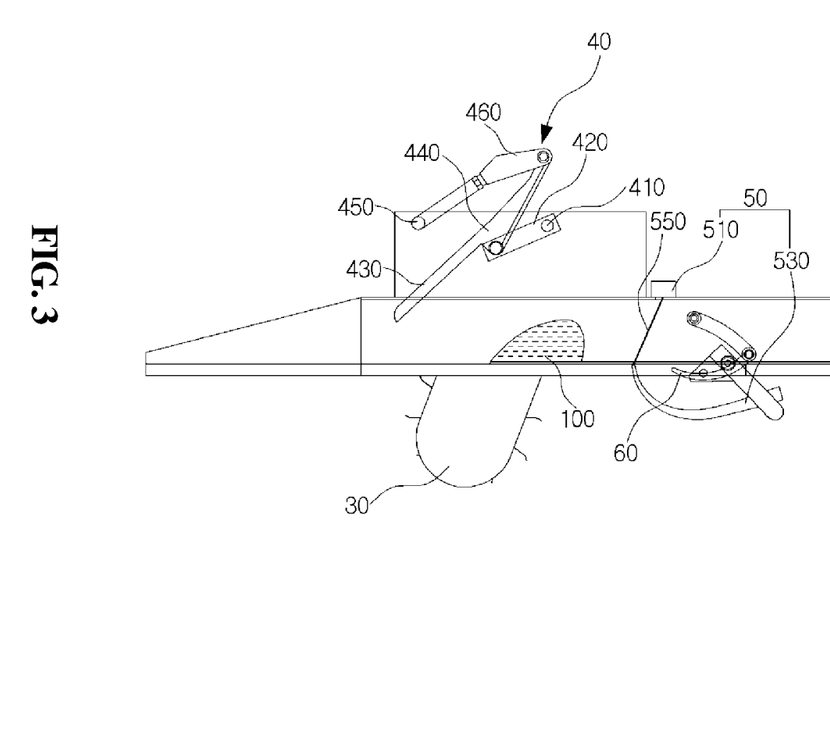
FIG. 3 is a view illustrating the state in which hay is picked up in an inner space of a bale chamber by a pickup part.

FIG. 3 is a view illustrating the state in which hay is picked up in the inner space of the bale chamber by the pickup part.

The knotting part 50 has a knotting member 510 and a needle member 530, wherein the knotting member 510 is provided at an upper portion of a rear side of the bale chamber 20 so as to knot and cut a bale string 550, and the needle member 530 is provided at a lower part of the rear side of the bale chamber 20 so as to perform a vertical angular movement and guide the bale string 550 to the knotting member 510.

Since the knotting member 510 is a conventional element of a baler that is provided at the upper portion of the rear side of the bale chamber 20 so as to knot and cut the bale string 550, a detailed description thereof will be omitted. When a sufficient amount of hay is compressed in the inner space of the bale chamber 20, the needle member 530 performs an angular motion upwards so as to guide, to the knotting member 510, the bale string 550, which is then knotted and cut by the knotting member 510.

A compression arm 60 is preferably provided to additionally compress the hay, which was pushed and compressed backwards in the inner space of the bale chamber by the rake part 40, in order to prevent the compressed hay from becoming loose when the rake part 40 is being rotated and moved up.

The compression arm 60 is provided at the lower side of the bale chamber 20 between the rake part 40 and the needle member 530 such that the compression arm can perform a vertical angular motion. When the rake part 40 is rotated and moved up, the compression arm 60 performs an upward angular motion into the inner space of the bale chamber 20 from the lower side of the bale chamber 20. That is, when the hay compressed by the rake part 40 becomes loose during the rotation and upward motion of the rake part 40, the compression arm 60 performs the upward angular motion so as to maintain and compress the compressed hay.

During the rotation and downward motion of the rake part 40, the compression arm 60 performs a downward angular motion in the inner space of the bale chamber 20. Such an angular motion of the compression arm 60 downwards from the bale chamber 20 allows the rake part 40 to easily push and compress the hay picked up by the pickup part 30 towards the rear side of the bale chamber 20.

Figure 4:
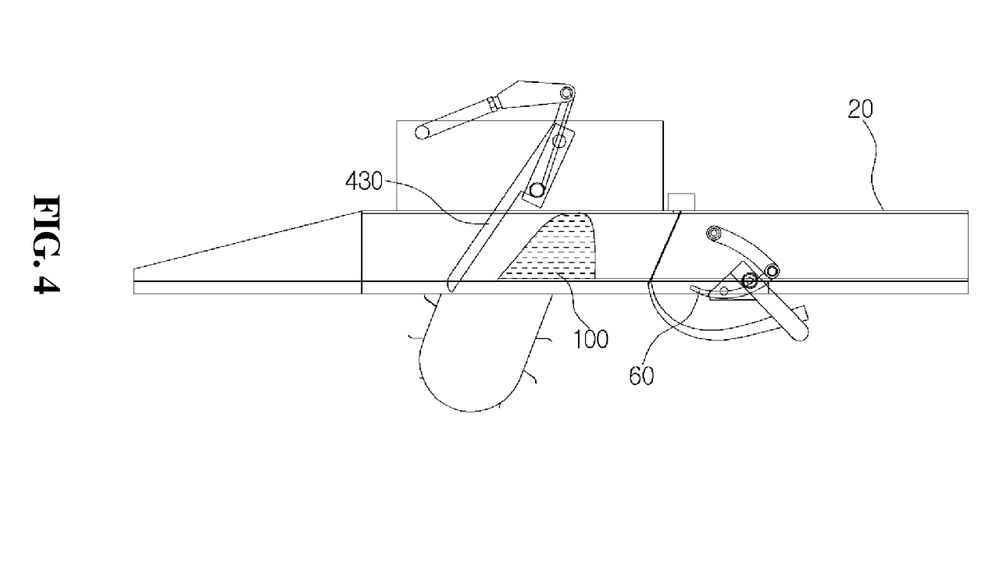
FIGS. 4 and 5 are views illustrating the states in which hay is being compressed by the rake part.
Figure 5:
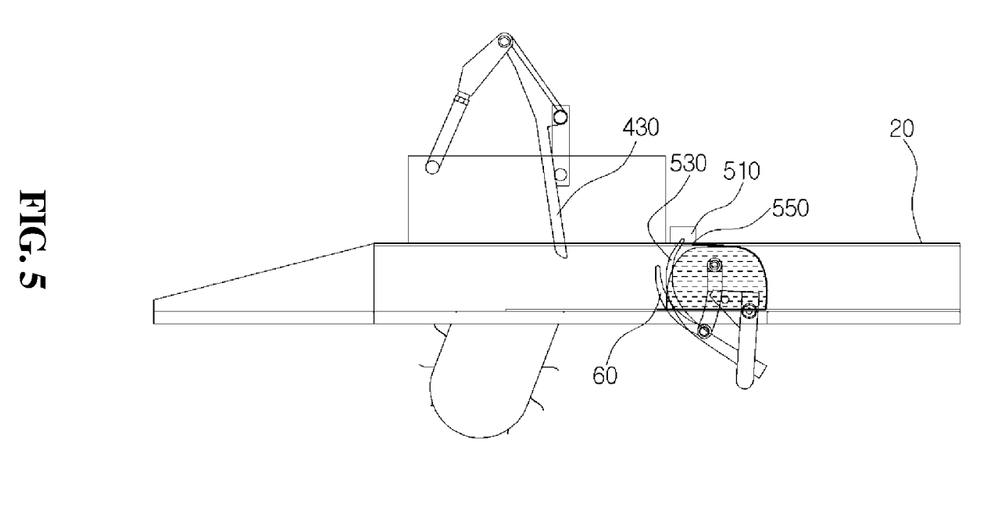
Figure 6:
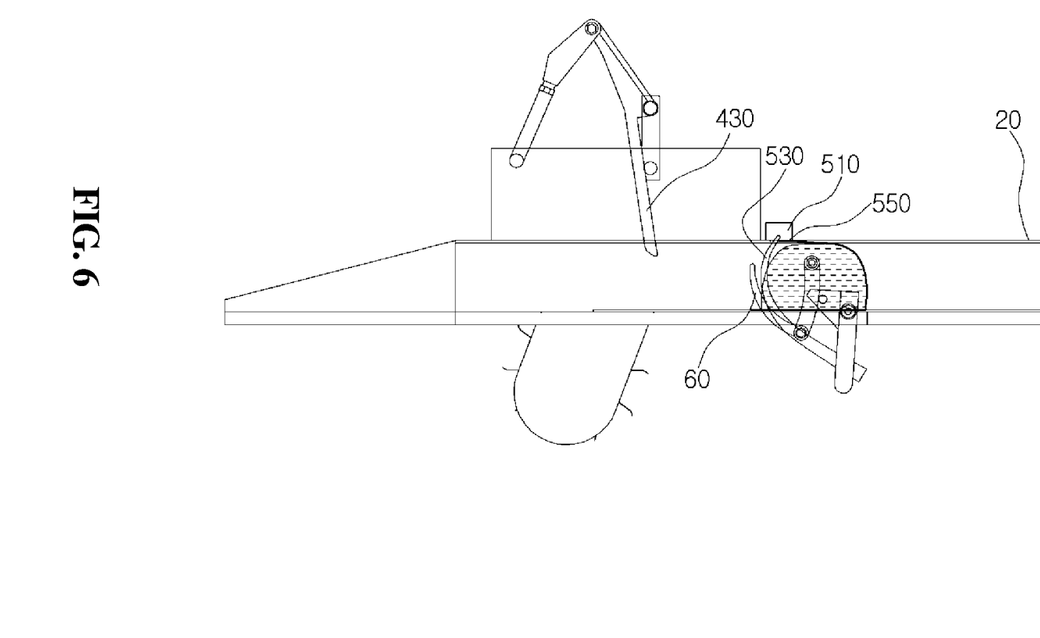
FIG. 6 is a view illustrating the state in which the hay compressed by the rake part is held by the compression arm being moved up.

FIGS. 4 and 5 are views illustrating the states in which hay is being compressed by the rake part, and FIG. 6 is a view illustrating the state in which the hay compressed by the rake part is held by the compression arm being moved up.

In the state in which the bale string 550 is positioned between the knotting member 510 and the needle member 530 as illustrated in FIG. 3, the pickup part 30 picks up the hay and provides it to the bale chamber 20. The rake part 40 is configured to rotate in a counterclockwise direction. The compression arm 60 is configured to perform an angular motion in a vertical direction. The needle member 530 is configured to measure a length of hay compressed in the bale chamber 20, and when the length of the compressed hay is determined to reach a predetermined level, move upwards.

When the rake member 430 is rotated and moved down as illustrated in FIG. 3, the compression arm 60 is moved towards the lower part of the bale chamber 20.

As illustrated in FIG. 4, when the rake member 430 is rotated and moved down so as to push and compress the hay provided in the bale chamber 20 in a backward direction, the vertical angular motion of the compression arm 60 switches to the upward angular motion.

As illustrated in FIG. 5, when the rake member 430 is rotated and moved up in the state in which the hay 100 provided in the bale chamber 20 was pushed and compressed by the rake member 430, the compression arm 60 performs the upward angular motion to prevent the compressed hay 100 from becoming loose.

Further, as illustrated in FIG. 6, when the rake member 430 is moved up, the compression arm 60 is maximally moved upwards so as to effectively prevent the hay from being uncompressed. Here, when a predetermined length of the hay is compressed in the bale chamber 20, the needle member 530 is moved up so that the knotting member 510 is positioned on a leading end side of the needle member 530 so as to knot and cut the bale string being guided, thereby binding the hay.

Figure 7:
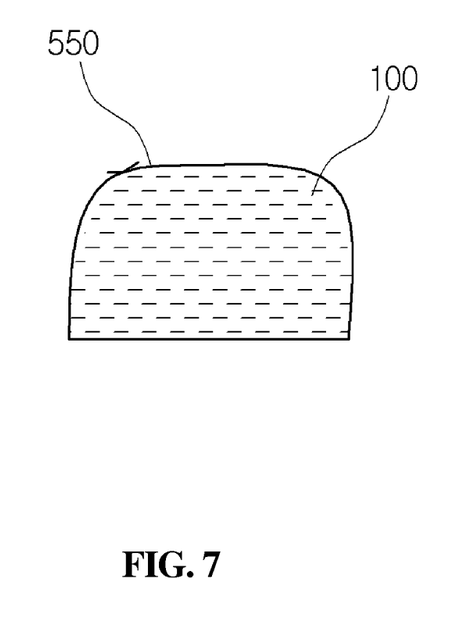
FIG. 7 is a view schematically illustrating the state in which hay is knotted by a bale string.

FIG. 7 is a view schematically illustrating the state in which hay 100 is knotted by the bale string 550.

In the meantime, although in FIG. 1, power transmitted to the power transmission from the tractor is transmitted to the rake part 40, the compression arm 60, the needle member 530, the knotting member 510, and the like via a set of sprocket and chain, the present invention is not limited to the above embodiment. For example, it may also be possible to transmit the power using gears or the like.

INDUSTRIAL APPLICABILITY

The square baler according to the present invention is formed in a different simple structure from an existing plunger type square baler so as to advantageously have excellent productivity and be able to effectively compress and bale hay in a bale chamber.

The invention claimed is:

1. A square baler comprising:
   a frame;
   a bale chamber formed on the frame so as to be opened forward and backward, and having a square cross-section;
   a knotting part having a knotting member and a needle member, wherein the knotting member is provided at an upper portion of a rear side of the bale chamber so as to knot and cut a bale string, and the needle member is provided at a lower part of the rear side of the bale chamber so as to perform a vertical angular movement and guide the bale string to the knotting member;
   a pickup part picking up and providing hay in a front inner space of the bale chamber;
   a rake part rotatably installed on an upper portion of a front side of the bale chamber so as to, during a rotation and a downward motion of the rake part, push and compress the hay, which was picked up and provided to the front inner space of the bale chamber, towards the rear side where the bale string is positioned between the knotting member and the needle member; and
   a compression arm provided to prevent the hay, which was pushed and compressed backwards by the rake part, from being uncompressed during the rotation and upward motion of the rake part and re-compress the hay.

2. The square baler according to claim 1, wherein the compression arm is provided at a lower side of the bale chamber between the rake part and the needle member such that the compression arm is able to perform a vertical angular motion.

3. The square baler according to claim 2, wherein the compression arm is operated such that the compression arm performs an upward angular motion into the inner space of the bale chamber from the lower side of the bale chamber during the rotation and upward motion of the rake part, and the compression arm performs a downward angular motion from the inner space of the bale chamber towards the lower side of the bale chamber during the rotation and downward motion of the rake part.

4. A square baler comprising:
   a frame;
   a bale chamber formed on the frame so as to be opened forward and backward, and having a square cross-section;
   a knotting part having a knotting member and a needle member, wherein the knotting member is provided at an upper portion of a rear side of the bale chamber so as to knot and cut a bale string, and the needle member is provided at a lower part of the rear side of the bale chamber so as to perform a vertical angular movement and guide the bale string to the knotting member;
   a pickup part picking up and providing hay in a front inner space of the bale chamber; and
   a rake part rotatably installed on an upper portion of a front side of the bale chamber so as to, during a rotation and a downward motion of the rake part, push and compress the hay, which was picked up and provided to the inner space of the bale chamber, towards the rear side where the bale string is positioned between the knotting member and the needle member,
   wherein the rake part includes a drive shaft provided on an upper side of the bale chamber such that the drive shaft is able to rotate by a drive source, a support stage extending perpendicular to an end of the drive shaft, a rake member having an upper end rotatably fixed to the support stage, an extension member provided to extend upwards from the upper end of the rake member, a rotary shaft provided in front of the drive shaft, and an auxiliary member provided such that a lower end thereof is rotatably fixed to the rotary shaft, and an upper end thereof is shaft-connected to an upper end of the extension member.

* * * * *